US008108610B1

(12) United States Patent
Glasco et al.

(10) Patent No.: US 8,108,610 B1
(45) Date of Patent: Jan. 31, 2012

(54) CACHE-BASED CONTROL OF ATOMIC OPERATIONS IN CONJUNCTION WITH AN EXTERNAL ALU BLOCK

(75) Inventors: David B. Glasco, Austin, TX (US);
Peter B. Holmqvist, Cary, NC (US);
George R. Lynch, Raleigh, NC (US);
Patrick R. Marchand, Apex, NC (US);
Karan Mehra, Cary, NC (US); James Roberts, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 749 days.

(21) Appl. No.: 12/255,595

(22) Filed: Oct. 21, 2008

(51) Int. Cl.
*G06F 12/16* (2006.01)

(52) U.S. Cl. ................ 711/118; 711/125; 711/E12.001; 712/214

(58) Field of Classification Search .................. None
See application file for complete search history.

(56) References Cited

U.S. PATENT DOCUMENTS

| 5,706,464 | A * | 1/1998 | Moore et al. ................. 711/122 |
| 6,347,360 | B1 * | 2/2002 | Moudgal et al. ............. 711/133 |
| 6,389,517 | B1 * | 5/2002 | Moudgal et al. ............. 711/146 |
| 2004/0162951 | A1 * | 8/2004 | Jacobson et al. ............. 711/143 |
| 2006/0112261 | A1 * | 5/2006 | Yourst et al. ................. 712/218 |
| 2007/0050559 | A1 * | 3/2007 | Alsup ........................... 711/145 |

FOREIGN PATENT DOCUMENTS

WO   WO 2008088931 A2 *  7/2008

OTHER PUBLICATIONS

Slechta, B.; Crowe, D.; Fahs, N.; Fertig, M.; Muthler, G.; Quek, J.; Spadini, F.; Patel, S.J.; Lumetta, S.S.; , "Dynamic optimization of micro-operations," High-Performance Computer Architecture, 2003. HPCA-9 2003. Proceedings. The Ninth International Symposium on , vol., No., pp. 165-176, Feb. 8-12, 2003.*

* cited by examiner

*Primary Examiner* — Pierre-Michel Bataille
*Assistant Examiner* — Ralph A Verderamo, III
(74) *Attorney, Agent, or Firm* — Patterson & Sheridan, LLP

(57) ABSTRACT

One embodiment of the invention sets forth a mechanism for efficiently processing atomic operations transmitted from multiple general processing clusters to an L2 cache. A tag look-up unit tracks the availability of each cache line in the L2 cache, reserves the necessary cache lines for the atomic operations and transmits the atomic operations to an ALU for processing. The tag look-up unit also increments a reference counter associated with a reserved cache line each time an atomic operation associated with that cache line is received. This feature allows multiple atomic operations associated with the same cache line to be pipelined to the ALU. A ROP unit that includes the ALU may request additional data necessary to process an atomic operation from the L2 cache. Result data is stored in the L2 cache and may also be returned to the general processing clusters.

20 Claims, 9 Drawing Sheets

CACHE-BASED CONTROL OF ATOMIC OPERATIONS IN CONJUNCTION WITH AN EXTERNAL ALU BLOCK

BACKGROUND OF THE INVENTION

1. Field of the Invention

The present invention relates generally to the field of data processing and, more specifically, to cache-based control of atomic operations in conjunction with an external ALU block.

2. Description of the Related Art

One element of a memory subsystem within certain processing units is a Level 2 Cache memory (referred to herein as "L2 cache"). The L2 cache is a large on-chip memory that serves as an intermediate point between an external memory (e.g., frame buffer memory) and internal client of the memory subsystem (referred to herein as the "clients"). The clients transmit many downstream operations to the L2 cache in a parallel processing architecture. Some of these operations are simple load/store operations, where the L2 cache temporarily stores data that the clients are reading from and writing to the external memory (usually a DRAM store), while other operations transmitted from the clients involve further computational operations on the data coming from the clients. Many of the operations involving further computation are atomic in nature. The results of these operations are stored in the L2 cache before being written to external memory and may also be returned to the clients.

One consequence of the different clients generating so many downstream operations is that efficiently processing the atomic operations becomes complicated. For example, as atomicity must be maintained while the atomic operation is being processed, the space reserved for the atomic operation in the L2 cache cannot be read from or written to until the atomic operation has been completely processed. Further, operations (atomic or otherwise) that depend on accessing the L2 cache memory space reserved for the atomic operation need to be halted until the memory space is ready to be used, that is, when the atomic operation has been processed. The L2 cache needs to be able to distinguish between these dependent operations and operations that are independent of the reserved memory space in the L2 cache. The independent operations should be processed by the L2 cache normally.

As the foregoing illustrates, what is needed in the art is a mechanism for efficiently processing downstream atomic operations in a parallel processing architecture.

SUMMARY OF THE INVENTION

One embodiment of the present invention sets forth a method for processing an atomic operation received by an intermediate cache coupled to one or more clients and to an external memory. The method includes the steps of receiving the atomic operation from a client, the atomic operation including an atomic command and an atomic data payload, transmitting the atomic command to a tag look-up unit, determining whether a cache line within a data cache unit associated with the atomic command is available, incrementing a cache line reference counter associated with the cache line, and transmitting the atomic command and the atomic payload data to an arithmetic logic unit residing external to the intermediate cache for processing.

One advantage of the disclosed method is that related atomic operations (i.e., those associated with the same cache line in the intermediate cache) received by the intermediate cache from one or more clients may be pipelined. Pipelining related atomic operation increases the overall processing efficiency since the number of atomic operations stalled in the intermediate cache while waiting for cache line availability can be reduced.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
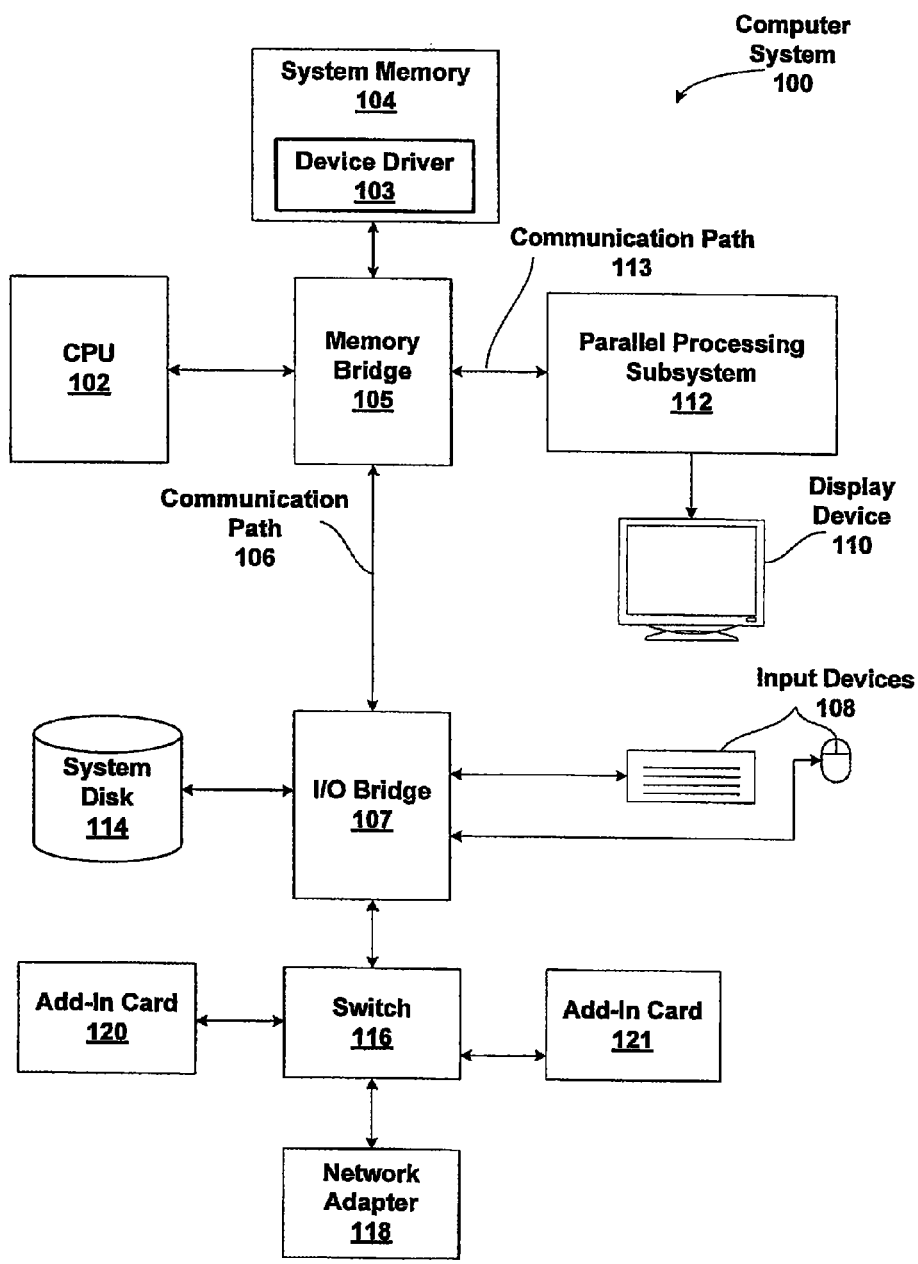
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
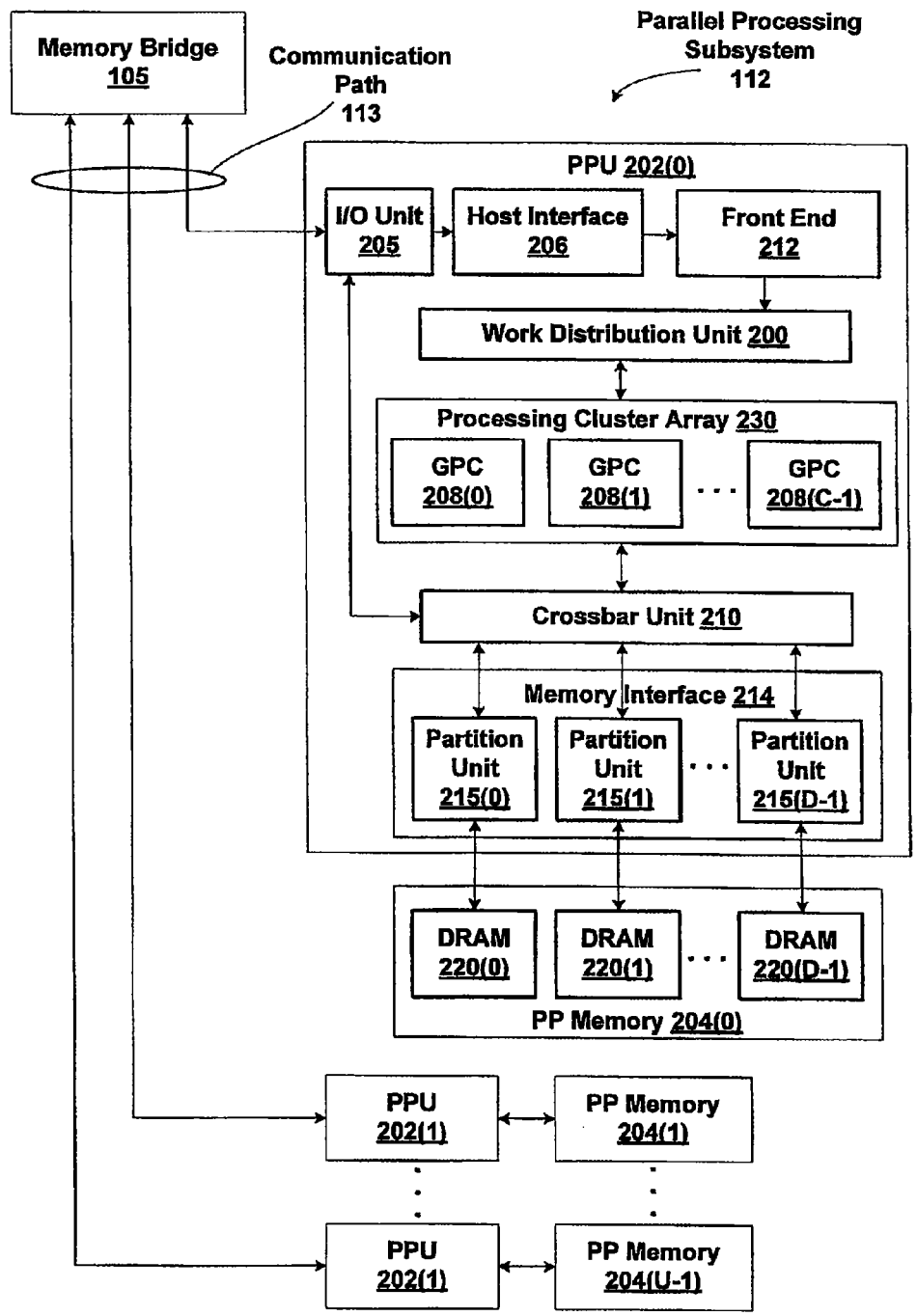
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where $D \geq 1$. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
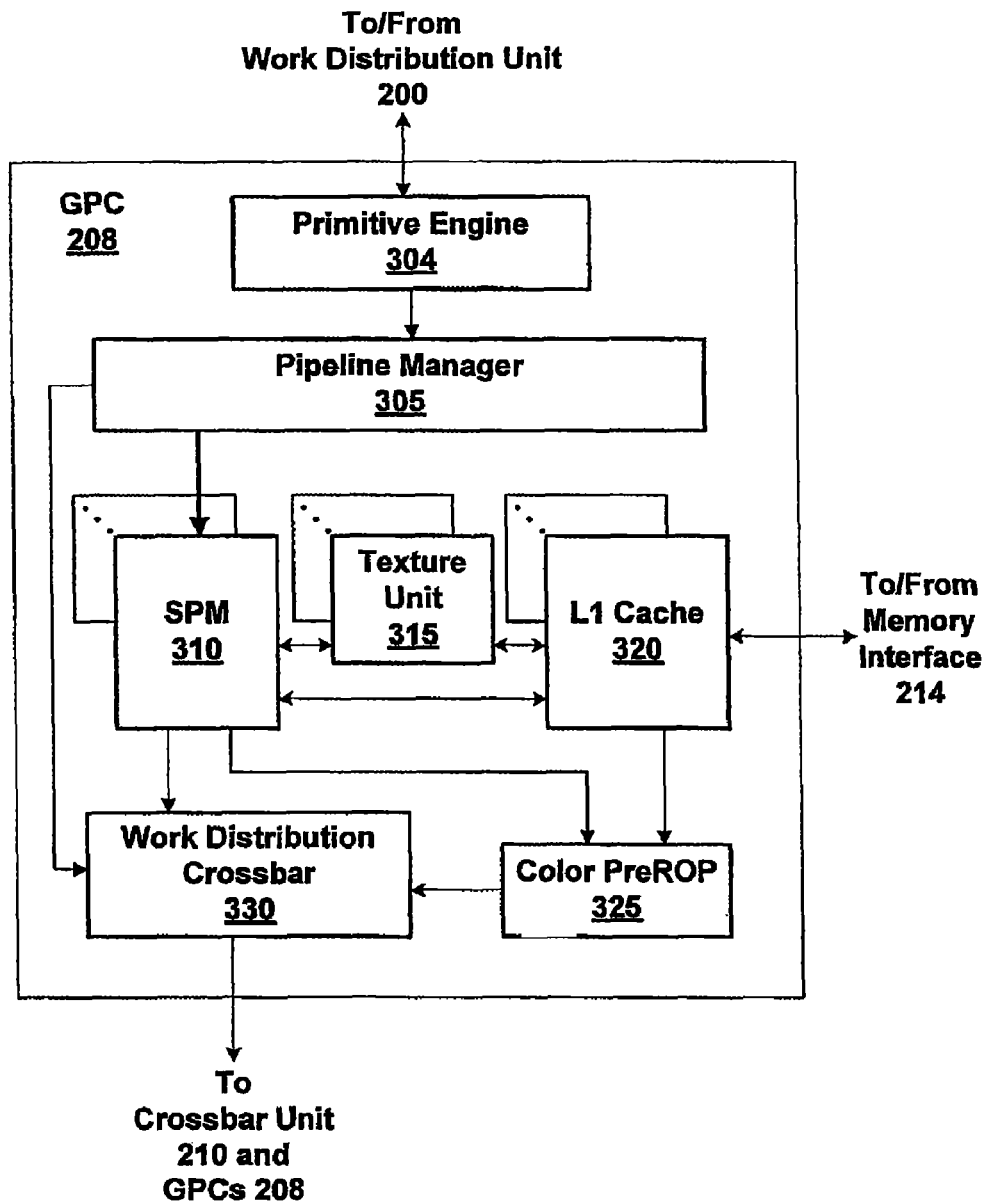
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In other embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPU 208 may be configured to implement a primitive engine 304 for performing screen space graphics processing functions that may include, but are not limited to primitive setup, rasterization, and z culling. In some embodiments, primitive engine 304 is configured to gather pixels into tiles of multiple neighboring pixels before outputting the pixels to L1 cache 320 in order to improve the access efficiency of L1 cache 320. Primitive engine 304 receives a processing task from work distribution unit 200, and when the processing task does not require the operations performed by primitive engine 304, the processing task is passed through primitive engine 304 to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≧1, each SPM 310 configured to process one or more thread groups. Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to GXM thread groups can be executing in GPC 208 at any given time.

Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory.

In graphics applications, a GPC 208 may be configured such that each SPM 310 is coupled to a texture unit 315 for performing texture mapping operations, e.g., determining texture sample positions, reading texture data, and filtering the texture data. Texture data is read from L1 cache 320 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A color preROP (pre-raster operations) 325 is configured to perform optimizations for color blending, organize pixel color data, and perform address translations.

It will be appreciated that the core architecture described herein is illustrative and that variations and modifications are possible. Any number of processing engines, e.g., primitive engines 304, SPMs 310, texture units 315, or color preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
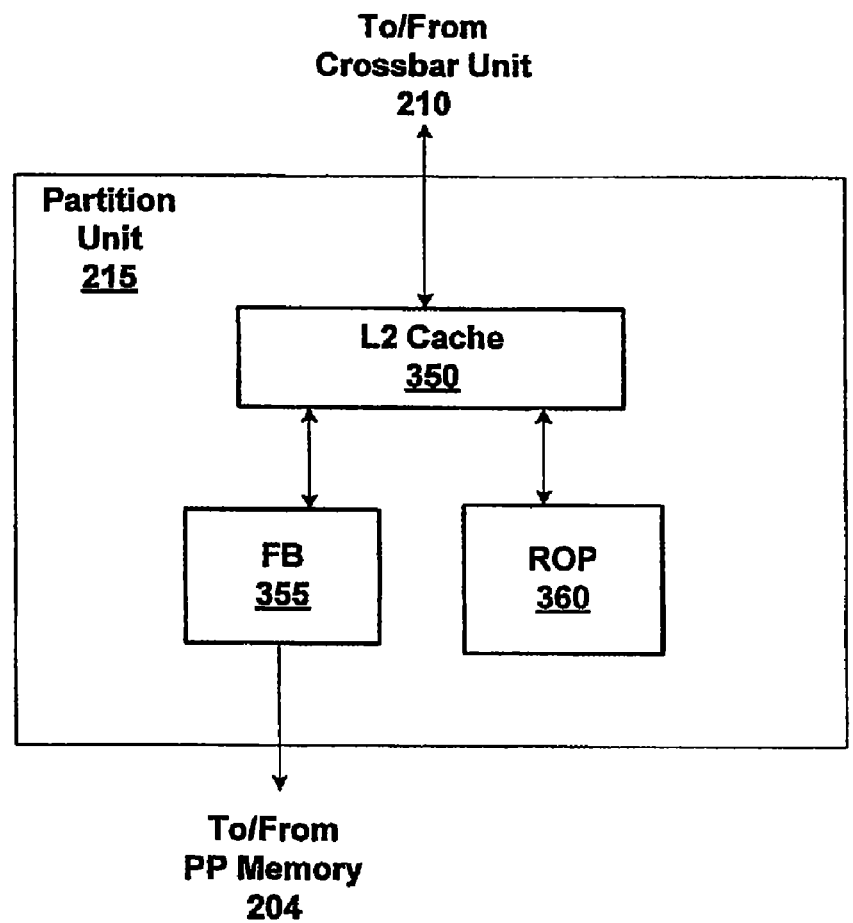
FIG. 3B is a block diagram of a partition unit within one of the PPUs of FIG. 2, according to one embodiment of the present invention.

FIG. 3B is a block diagram of a partition unit 215 within on of the PPUs 202 of FIG. 2, according to one embodiment of the present invention. As shown, partition unit 215 includes an L2 cache 350, a frame buffer (FB) 355, and a raster operations unit (ROP) 360. L2 cache 350 is a read/write cache that is configured to perform load and store operations received from crossbar unit 210 and ROP 360. In some embodiments, L2 cache 350 may be split into four (or fewer) slices in order to interface with memory crossbar unit 210 at four times the bandwidth of FB 355. Read misses and urgent writeback requests are output by L2 cache 350 to FB 355 for processing. Dirty updates are also sent to FB 355 for opportunistic processing. FB 355 interfaces directly with parallel processing memory 204, outputting read and write requests and receiving data read from parallel processing memory 204.

In graphics applications, ROP 360 is a processing unit that performs raster operations, such as stencil, z test, and the like, and outputs pixel data as processed graphics data for storage in graphics memory. The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 is configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Processing Atomic Operations

Figure 4A:
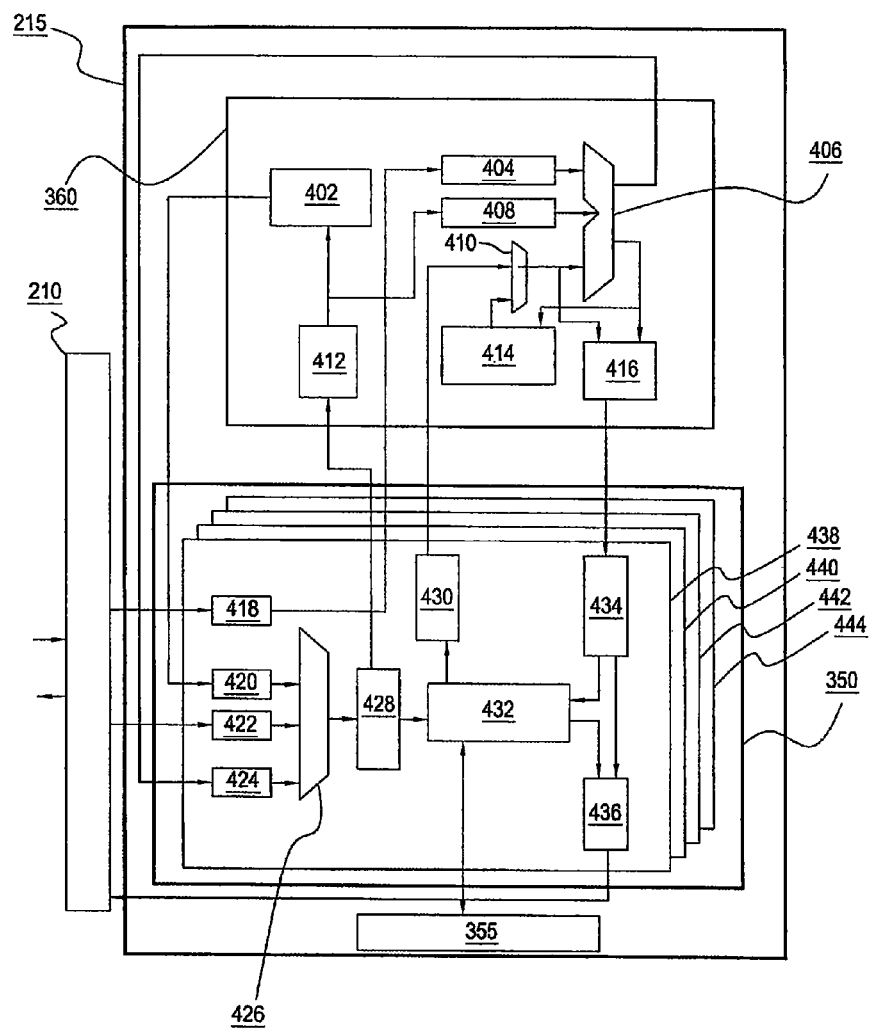
FIG. 4A is a more detailed block diagram of a partition unit of FIG. 3B, according to one embodiment of the present invention.

FIG. 4A is a detailed block diagram of the partition unit 215 of FIG. 3B, according to one embodiment of the present invention. As shown, the partition unit 215 includes the ROP 360, the L2 cache 350 and the FB 355. The L2 cache 350 includes four L2 cache slices 438, 440, 442 and 444. The L2 cache slices 438, 440, 442 and 444 have independent command and data connections to the crossbar unit 210 and the FB 355 and share the processing capabilities of the ROP 360. For purposes of simplicity, only the configuration of L2 cache slice 438 will be discussed herein.

The L2 cache slice 438 includes a crossbar data buffer 418, a ROP read command buffer 420, a crossbar command buffer 422 and a ROP write command buffer 424. The crossbar data buffer 418 is connected to the crossbar unit 210 and is configured to receive data payloads associated with write operations and atomic operations from the crossbar unit 210. The crossbar command buffer 422 is connected to the crossbar unit 210 and receives read, write and atomic commands from the different GPCs 208 via the crossbar unit 210. The ROP read command buffer 420 receives read commands from the ROP 360. The ROP write command buffer 424 is configured to receive write commands from the ROP 360. The ROP read command buffer 420, the crossbar command buffer 422 and the ROP write command buffer 424 are FIFO (first-in-first-out) buffers, that is, the commands received by the command buffers are output in the order the commands are received from the crossbar unit 210 or the ROP 360. The ROP 360 also receives requests from the crossbar unit 210 to perform graphics transactions other than atomic operations.

The L2 cache slice 438 also includes an arbiter 426, a tag look-up unit 428, a ROP read data return buffer 430, a data cache 432, a ROP result data buffer 434 and a crossbar result data buffer 436. The ROP read command buffer 420, the crossbar command buffer 422 and the ROP write command buffer 424 are connected to the arbiter 426. The arbiter 426 is connected to the tag look-up unit 428 and is configured to use standard arbitration techniques to select a given command from the command ROP read command buffer 420, the crossbar command buffer 422 or the ROP write command buffer 424 and then transmit the selected command to the tag look-up unit 428 for processing.

The tag look-up unit 428 is configured to determine whether there is cache line availability in the data cache 432 for data associated with the read, write or atomic command transmitted by the arbiter 426. In one embodiment, the data cache 432 is a physically-indexed and tagged 64KB set associative data cache. The data cache 432 is divided into four segments; each segment has thirty-two rows, each row having sixteen cache lines of 32B. At any given clock cycle, the cache lines in the data cache 432 may store resident data, may be reserved for an in-progress operation, or may be available to store data. Cache lines in the data cache 432 may be occupied with data waiting to be transmitted to the FB 355, the ROP 360 or the crossbar unit 210. Importantly, cache lines associated with an atomic operation are reserved until the atomic operation has been completely processed. In addition, a reference counter is associated with each cache line in the data cache 432 to indicate the number of atomic operations that are associated with each particular cache line at any given time. The reference counter also ensures that the data stored in the associated cache line is not evicted by the data cache 432 until the atomic commands associated with that particular cache line are processed, i.e., when then reference counter is zero.

A new read, write or atomic command transmitted to the tag look-up unit 428 includes a memory address that is associated with a set of cache lines in the data cache 432 (referred to herein as the "identified set of cache lines"). The data associated with the read, write or atomic command is stored in one of the cache lines in the identified set of cache lines, as determined by the tag look-up unit 428. The tag look-up unit 428 first determines whether a cache line in the identified set of cache lines is already reserved (a cache hit) for a previous read, write or atomic command associated with the same memory address included in the new read, write or atomic command. If so, then the tag look-up unit 428 does not need to reserve a new cache line in the identified set of cache lines. If a cache line is not already reserved (a cache miss) for a previous read, write or atomic operation associated with the same memory address, then the tag look-up unit 428 determines whether a cache line in the identified set of cache lines is available for the data associated with the read, write or atomic command. If a cache line is available, then the tag look-up unit 428 reserves the particular cache line for that command. If no cache line in the identified set of cache lines is available, then the tag look-up unit 428 is configured to stall or replay a read or write command for which the required cache line is unavailable, until a cache line can be reserved for the operation.

Data stored in the crossbar data buffer 418 that is associated with a write command, for which a cache line has been reserved by the tag look-up unit 428, is retrieved from the crossbar data buffer 418 and stored in the reserved cache line in the data cache 432. A cache line reserved for a read command receives the requested data from the FB 355 at a future clock cycle. In the case of an atomic command, the tag look-up unit 428 increments the reference counter associated with the cache line in the data cache 432 allocated to the atomic operation and transmits the atomic command to the ROP 360 for processing. Tracking a reference counter associated with a specific cache line allows atomic commands that are associated with the same cache line in the data cache 432 to be pipelined.

The data cache 432 is coupled to the FB 355, the ROP read data return buffer 430, and the crossbar result data buffer 436. The ROP read data return buffer 430, the ROP result data buffer 434 and the crossbar result data buffer 436 are FIFO buffers, configured to output data in the order the data was received. The ROP read data return buffer 430 is configured to store data transmitted from the data cache 432 until the data is transmitted to the ROP 360 for processing. The ROP result data buffer 434 is connected to the data cache 432 and is configured to store result data from the ROP 360 until the result data is transmitted to the data cache 432 and/or the crossbar result data buffer 436. In one embodiment, each of the ROP read data return buffer 430 and the ROP result data buffer 434 has two threads, one thread for color data and one thread for data associated with atomic operations. These threads are independent and maintain order of the data associated with each thread. The separation of data associated with atomic operations and data associated with color graphics processing ensures that the processing of the atomic operation is not unnecessarily stalled. The crossbar result data buffer 436 stores result data transmitted from the ROP 360 or the data cache 432 until the result data is transmitted to the crossbar unit 210 for further transmission.

The ROP 360 includes an atomic command buffer 412, a read command generator 402, an atomic data buffer 404, an arithmetic logic unit (ALU) 406, and an atomic command queue 408. The ROP 360 also includes a MUX 410, a local ROP cache 414, and a result data sequencer 416. The atomic command buffer 412 is configured to receive atomic commands from the L2 cache slice 438 and transmit the atomic commands to the read command generator 402 and the atomic command queue 408. The logic encoded in the read command generator 402 determines whether the data required to process an atomic operation is not available in the local ROP cache 414 and if so generate and transmit a read request to the ROP read command buffer 420 in the L2 cache slice 438 to retrieve that data. The atomic data buffer 404 is configured to retain atomic data payloads transmitted from the crossbar data buffer 418 in the L2 cache slice 438 until the atomic data payloads are transmitted to the ALU 406 in for processing. The atomic command queue 408 is configured to hold atomic commands transmitted from the atomic command buffer 412 until the atomic commands are transmitted to the ALU 406 for processing. The MUX 410 is configured to transmit data to the ALU 406 from either the ROP read data return buffer 430 in the L2 cache slice 438 or the local ROP cache 414, depending on where the data necessary for the relevant atomic operation is stored. The logic associated with the ALU 406 is configured to perform arithmetic and logic operations on the inputs of the atomic data buffer 404, atomic command queue 408 and the MUX 410. The local ROP cache 414 is a data cache associated with the ROP 360 and is configured to store result data associated with the atomic operations processed by the ALU 406. The result data sequencer 416 is configured to receive and sequence the result data from the ALU 406 and the MUX 410 and transmit the result data to the ROP result data buffer 434 in the L2 cache slice 438.

Figure 4B:
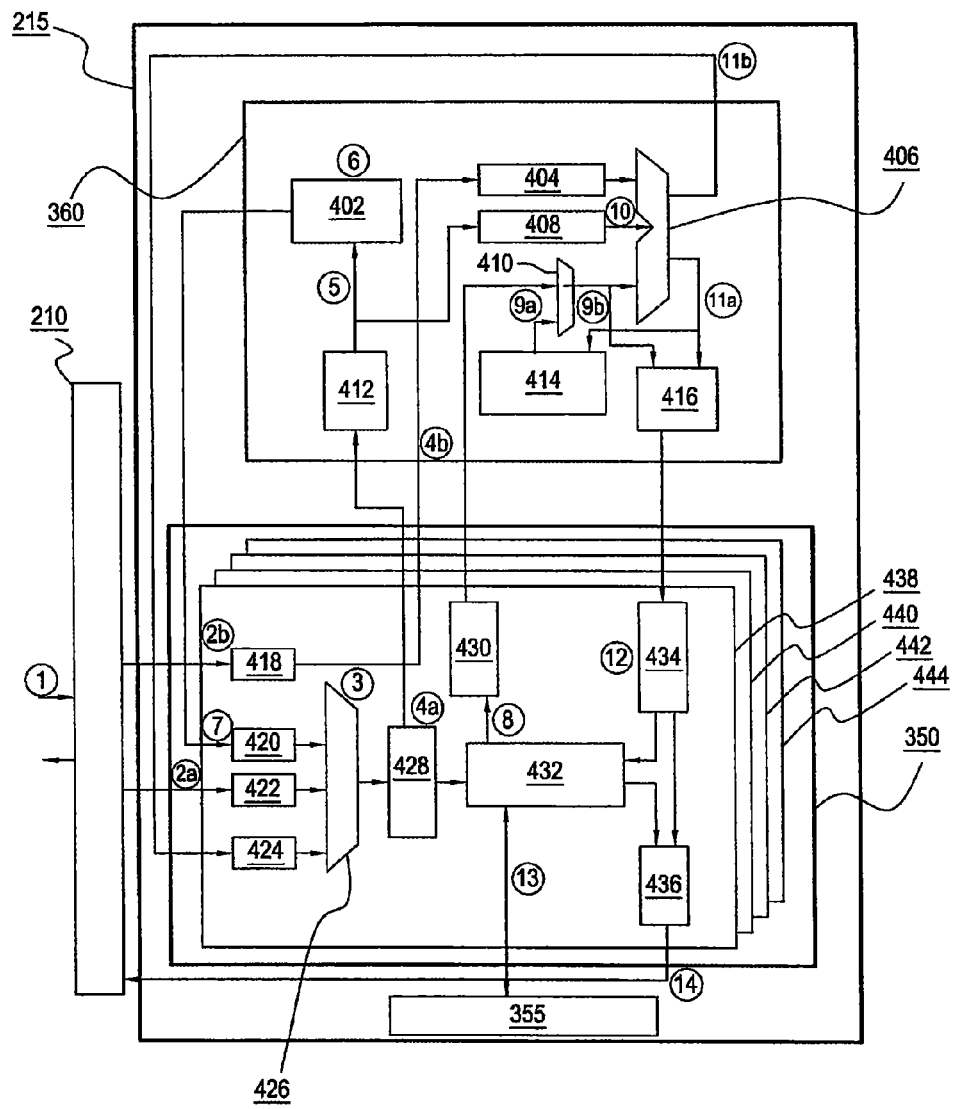
FIG. 4B is a more detailed block diagram of the partition unit of FIG. 3B illustrating the flow of atomic operations through the partition unit, according to one embodiment of the present invention.

FIG. 4B is a more detailed block diagram of the partition unit 215 of FIG. 3B illustrating the flow of atomic operations through the partition unit 215, according to one embodiment of the present invention. As shown, the partition unit 215 includes the ROP 360, the L2 cache 350 and the FB 355. The locations one through fourteen illustrate the flow of atomic operations transmitted by the crossbar unit 210 to the L2 cache 350 and are traced in the following discussion.

At location 1, an atomic operation is transmitted by one of the GPCs 208 to the L2 cache slice 438. The atomic operation includes an atomic command and an atomic data payload required to process the atomic operation. The atomic command includes a memory address of a specific cache line in the data cache 432 where the data associated with the atomic operation is stored. As is well known, atomic operations are typically of two types, a global atomic operation and a global reduction operation. A global atomic operation, such as increment, decrement and integer-add, requires that the data currently stored at the memory address included in the atomic command be returned to the GPC 208 and replaced by the result of the atomic operation. A global reduction operation, such as minimum, maximum and xor, requires that the result of the atomic operation be stored in the specific cache line in the data cache 432 associated with the memory address included in the atomic command. Unlike a global atomic operation, the result of a global reduction operation in this embodiment is not returned to the GPC 208 that initiated the atomic operation.

At location 2a, the atomic command associated with the atomic operation is transmitted by the crossbar unit 210 to the crossbar command buffer 422, where the atomic command is temporarily stored. At location 2b, the atomic data payload associated with the atomic operation is transmitted to the crossbar data buffer 418 by the crossbar unit 210.

At location 3, the arbiter 426 employs standard arbitration techniques to select one of the atomic commands in the crossbar command buffer 422. This selected atomic command is transmitted to the tag look-up unit 428 for processing. The tag look-up unit 428 then determines whether a cache line in the identified set of cache lines in the data cache 432 associated with the memory address included in the selected atomic command is reserved. If the cache line is not reserved, the tag look-up unit 428 reserves the cache line for the data associated with the atomic command and increments the reference counter associated with that particular cache line. If the cache line is available, but the necessary data is not stored in the cache line, then the reservation of the cache line for the atomic command also generates a request to the FB 355 to transmit the data associated with the particular cache line to the data cache 432. If the cache line is already reserved, the tag look-up unit 428 increments the reference counter associated with the cache line, indicating the existence of one more atomic command associated with the particular cache line.

At location 4a, the atomic command is transmitted by the tag look-up unit 428 to the atomic command buffer 412 in the ROP 360. Standard scheduling techniques are used to govern when each of the L2 cache slices 438, 440, 442 and 444 transmits atomic operations to the ROP 360. At location 4b, the atomic data payload associated with the atomic command is transmitted by the crossbar data buffer 418 to the atomic data buffer 404 in the ROP 360, where the data is stored until the atomic command is processed by the ALU 406. The crossbar data buffer 418 is also used as the write data buffer for non-atomic write operations, where the data would typically be pulled from the crossbar data buffer 414 and transmitted to the data cache 432.

At location 5, the atomic command is transmitted from the atomic command buffer 412 to both the atomic command queue 408 and the read command generator 402. At location 6, the read command generator 402 determines if the other portion of the data necessary to process the atomic operation is already stored in the local ROP cache 414 internal to the ROP 360. The read command generator 402 compares the memory address in the atomic command of the other portion of data necessary to process the atomic operation with the memory addresses of the data available in the local ROP cache 414. The read command generator 402 also keeps track of all outstanding read commands transmitted to the L2 cache slice 438 and compares the memory address of the other portion of data necessary to process the atomic operation with the memory addresses associated with the outstanding read commands. If the read command generator 402 determines that the local ROP cache 414 will not have the data necessary to process the atomic operation when the atomic command is processed from the atomic command queue 408, then a read command is generated by the read command generator 402. This generated read command includes the memory address associated with the cache line in the data cache 432 where the other portion of data necessary to the process the atomic operation is stored. The read command is transmitted to the ROP read command buffer 420 in the L2 cache slice 438.

At location 7, the read command transmitted by the read command generator 402 is stored in the ROP read command buffer 420. The arbiter 426 then selects the read command using standard arbitration techniques and transmits the read command to the tag look-up unit 428. The tag look-up unit 428 transmits a notification to the to the data cache 432 indicating that the data in the cache line associated with the memory address included in the read command has been requested by the ROP 360. At location 8, the requested data is transmitted by the data cache 432 to the ROP read data return buffer 430.

Referring again, now, to location 6, if the read command generator 402 determines that the local ROP cache 414 has or will have the necessary data required to process the atomic command, then the required data is not requested from the L2 cache slice 438 and locations 7 and 8 are skipped. At location 9a, the other portion of data necessary to process the atomic command stored in the atomic command queue 408 is selected by the MUX 410 from either the ROP read data return buffer 430 or the local ROP cache 414, depending on where the data is stored. At location 9b, the selected data is transmitted to the ALU 406, and, if the atomic operation is a global atomic operation, the selected data is also transmitted to the result data sequencer 416. At location 10, the ALU 406 performs the atomic operation based on the atomic command transmitted from the atomic command queue 408, the atomic data payload associated with the atomic command transmitted from the atomic data buffer 404, and the other portion of data necessary to process the atomic operation selected by the MUX 410.

At location 11a, the data resulting from the computation of the atomic operation is transmitted by the ALU 406 to the result data sequencer 416 and the local ROP cache 414. The local ROP cache 414 stores the result data for future atomic operations that may require that particular data. In one embodiment, the ROP 360 is able to determine that atomic operations in the atomic command queue 408 are associated with the same reserved cache line as the processed atomic operation and, therefore, does not return the result data to the result data sequencer 416 until the atomic operations associated with the reserved cache lines have been processed.

At location 11b, a write command is transmitted by the ALU 406 to the ROP write command buffer 424 in the L2 cache slice 438. The write command is processed by the arbiter 426 and the tag look-up unit 428, thereby enabling the result data transferred to the result data sequencer 416 and then to the ROP result data buffer 434 (at locations 11a and 12) to be stored in the data cache 432.

At location 12, the result data of the atomic operation and the data selected by the MUX 410 at location 9b stored in the result data sequencer 416 are transmitted to the ROP result data buffer 434. The result data of the atomic operation is transmitted to the data cache 432, where the result data is stored in the specific cache line associated with the memory address included in the processed atomic command. In the case of a global atomic operation, the ROP result data buffer 434 transmits the data selected by the MUX 410 to the crossbar result data buffer 436. The reference counter corresponding to the specific cache line associated with the memory address included in the processed atomic command is then decremented. Once the reference counter reads zero, the cache line may be used for a new operation, atomic or otherwise. At location 13, this result data is transmitted at an appropriate time by the data cache 432 to the FB 355 for storage in the parallel processing memory 204.

At location 14, in the case of a global atomic operation, the data transmitted by the ROP result data buffer 434 to the crossbar result data buffer 436 is transmitted to the crossbar unit 210. The crossbar unit 210 transmits this data back to the GPC 208 that initiated the global atomic operation.

Figure 5:
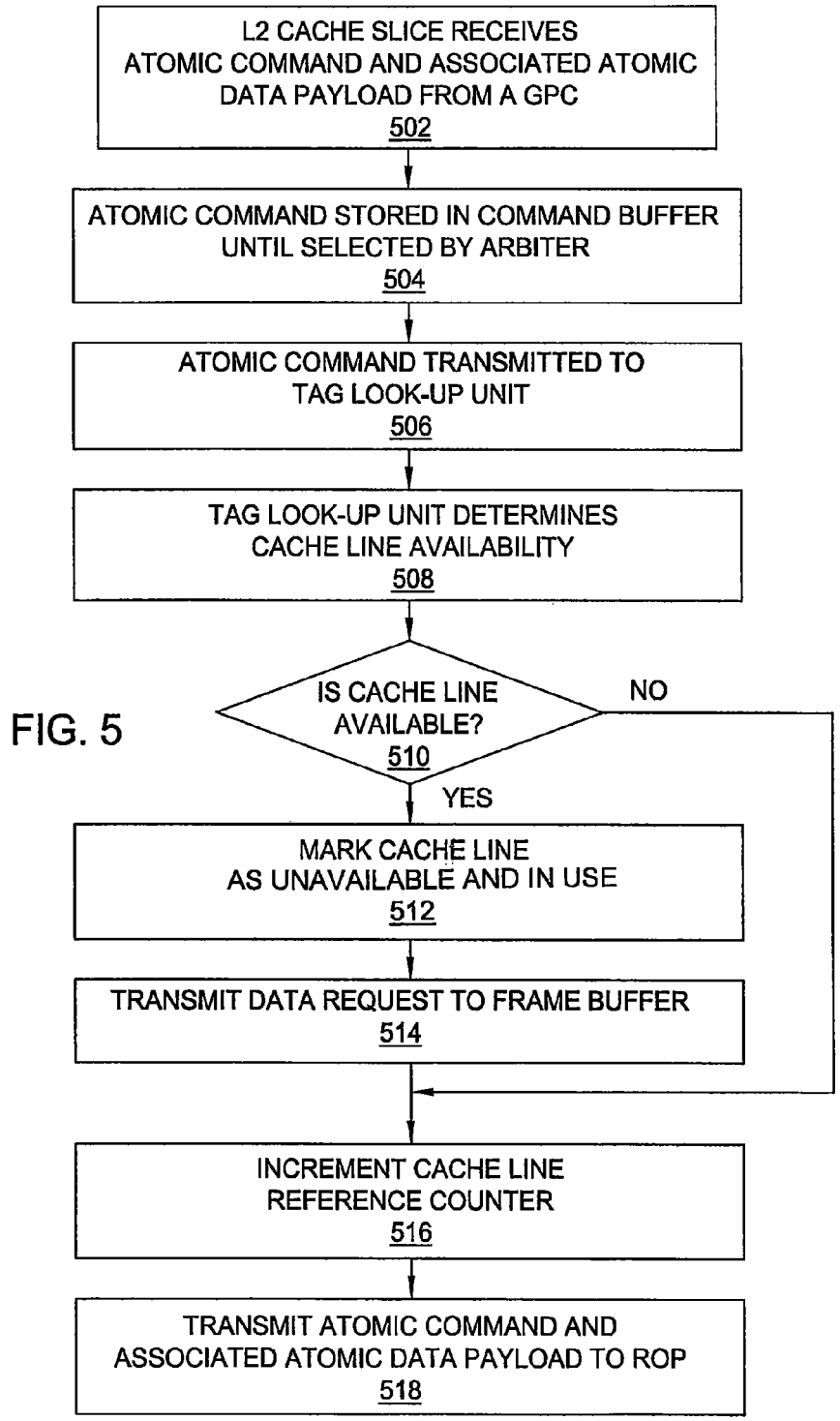
FIG. 5 is a flow diagram of methods steps for processing an atomic operation within an L2 cache slice, according to one embodiment of the present invention.

FIG. 5 is a flow diagram of method steps for processing an atomic operation within the L2 cache slice 438 of FIG. 4A, according to one embodiment of the present invention. Although the method steps are described in conjunction with the systems for FIGS. 1-4B, persons skilled in the art will understand that any system configured to perform the method steps, in any order, is within the scope of the invention.

The method 500 begins at step 502, where the L2 cache slice 438 receives an atomic operation consisting of an atomic command and an associated atomic data payload from one of the GPCs 208. As described above in conjunction with FIG. 4B, the atomic command is temporarily stored in the crossbar command buffer 422 and the associated atomic data payload is temporarily stored in the crossbar data buffer 418. At step 504, the atomic command is selected from the crossbar command buffer 422 by the arbiter 426 for processing. At step 506, the selected atomic command is then transferred to the tag look-up unit 428.

At step 508, the tag look-up unit 428 determines cache line availability in the data cache 432 for storing data associated with the atomic operation. As described in conjunction with FIG. 4A, the atomic command includes a memory address that is associated with a set of identified cache lines in the data cache 432. The tag look-up unit 428 determines whether a specific cache line in the set of identified cache lines is available to store data associated with the atomic operation. At step 510, if a cache line in the identified set of cache lines is already reserved for a previous command associated with the same memory address included in the atomic command, then the method 500 proceeds directly to step 516.

However, if a cache line in the identified set is not already reserved, then the method 500 proceeds to step 512, where the tag look-up unit 428 reserves an available cache line by marking the cache line as in use and unavailable to store data associated with a command including a different memory address. This step ensures that future commands, atomic or otherwise, accessing the same cache line can not manipulate the data present within the cache line until the selected command(s) to the address for which the cache line was allocated have all been processed. At step 514, the tag look-up unit 428 transmits a dirty data notification to the frame buffer 355 for the data associated with the reserved cache line so that the frame buffer 355 can clean the cache at a future clock cycle, and the method 500 proceeds to step 516.

At step 516, the tag look-up unit 428 increments the reference counter associated with the reserved cache line reserved. At step 518, the atomic command transferred to the tag look-up unit 428 in step 506 is transmitted by the tag look-up unit 428 to the ROP 360 for processing. In addition, the atomic data payload associated with the atomic command stored in the crossbar data buffer 418 is transmitted to the atomic data buffer 404 in the ROP 360.

As persons skilled in the art will understand, proceeding directly from step 510 to step 516 in the case of cache line previously reserved for the same memory address included in the in the current atomic command, allows for atomic commands associated with the same cache line to be pipelined. The L2 cache slice 438 may receive several atomic operations from the GPCs 208 that are associated with the same cache line in the data cache 432. The processing of each of these atomic operations depends on the result of the processing of a previous atomic operation. A reference counter associated with a cache line in the data cache 432 indicates the number of atomic operations that are associated with that particular cache line and are currently being processed by the ROP 360. A non-zero reference counter disallows the eviction of data stored in the particular cache line by the data cache 432. This mechanism ensures that the data required by the atomic operations associated with a particular cache line remains available until each of the atomic operations has been processed by the ROP 360, thereby allowing the ROP 360 to process the related atomic operations in a streamed, pipelined fashion.

More specifically, when a tag look-up unit 428 receives a first atomic operation where the reference counter of the associated cache line is zero, the tag look-up unit 428 reserves the cache line for the first atomic operation, increments the associated reference counter and transmits the atomic operation to the ROP 360 for processing. While the reference counter is greater than zero, each subsequently received atomic operation associated with the particular cache line depends on the result of a previously received atomic operation. The tag look-up unit 428 recognizes this dependency and transmits a subsequent atomic operation associated with the same cache line to the ROP 360 for processing and increments the associated reference counter. The ROP 360 then processes the atomic operations in the order the atomic operations are received. This approach ensures that the result data the first atomic operation required for the subsequent atomic operation is available in the local ROP cache 414 of the ROP 360 or in the reserved cache line associated with the atomic operation in the data cache 432 when the subsequent atomic operation is processed.

Figure 6:
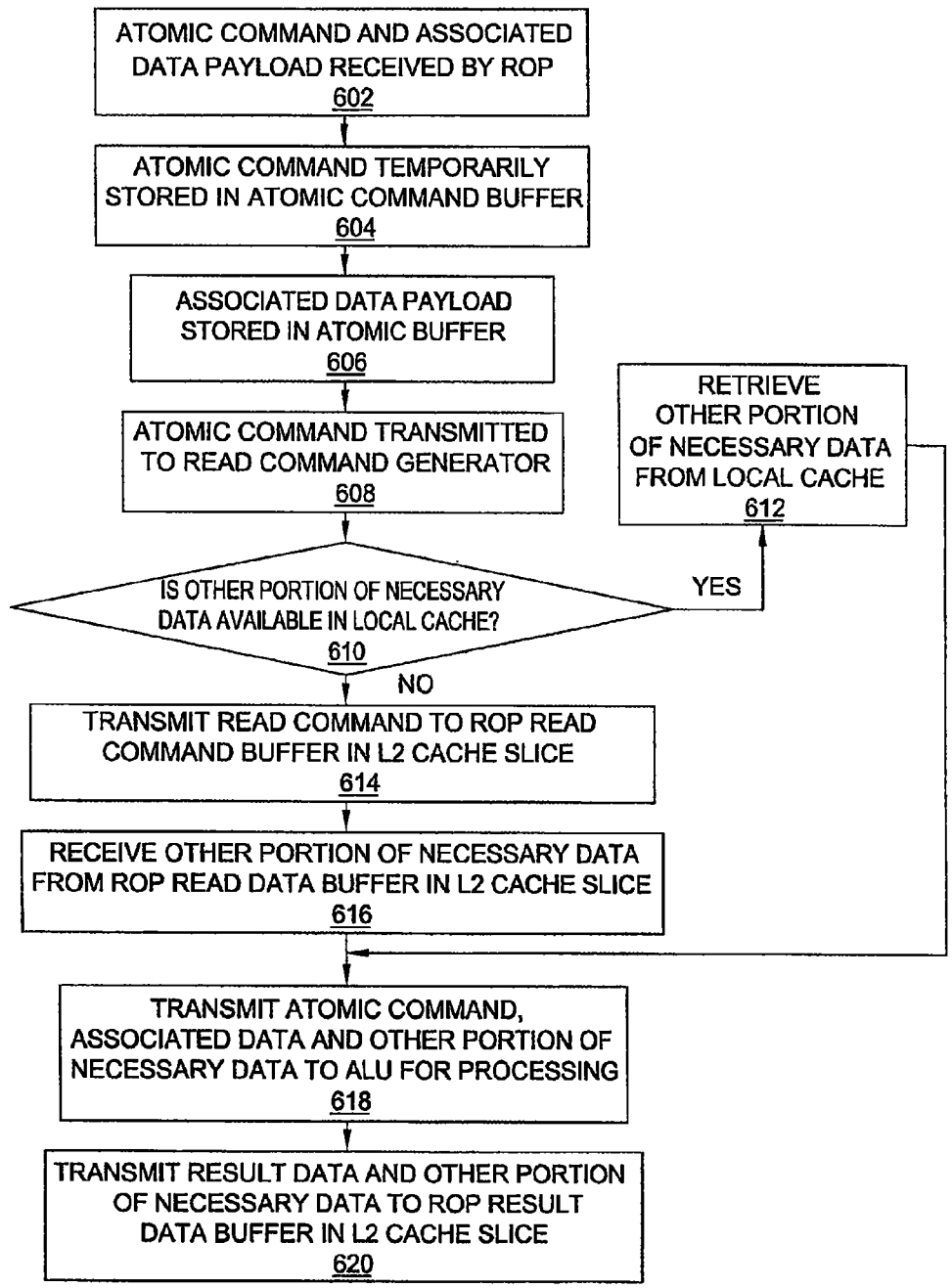
FIG. 6 is a flow diagram of method step for processing an atomic operation once the atomic operation is received by a ROP, according to one embodiment of the present invention.

FIG. 6 is a flow diagram of method step for processing an atomic operation once the atomic operation is received by a ROP 360, according to one embodiment of the present invention. Although the method steps are described in conjunction with the systems for FIGS. 1-4B, persons skilled in the art will understand that any system configured to perform the method steps, in any order, is within the scope of the invention.

The method 600 begins at step 602, where an atomic command and the associated atomic data payload are received by the ROP 360 from the L2 cache slice 438 of FIG. 4A. At step 604, the atomic command is temporarily stored in the atomic command buffer 412. As described above in conjunction with FIG. 4A, the atomic command buffer 412 is a FIFO buffer where different atomic commands are output in the order in which the atomic commands are received. At step 606, the associated atomic data payload is temporarily stored in the atomic data buffer 404.

At step 608, the atomic command in the atomic command buffer 412 is transmitted to the read command generator 402. As described above in conjunction with FIG. 4B, the read command generator 402 determines whether the other portion of data necessary to process the atomic operation is available in the local ROP cache 414 of the ROP 360. At step 610, if the other portion of data necessary to process the atomic operation is not available in the local ROP cache 414, then the method 600 proceeds to step 614. At step 614, the read command generator 402 transmits a read request to the ROP read command buffer 420 in the L2 cache slice 438 for the missing data. The read request includes the memory address of the cache line in the data cache 432 that is associated with the atomic command where the missing data is stored. As described above in conjunction with FIG. 4B, the read request in the ROP read command buffer 420 is selected by the arbiter 426 and processed by the tag look-up unit 428. In response to the selected read request, the tag look-up unit 428 transmits a data request to the data cache 432 for data stored in the cache line associated with the memory address included in the read request. The data cache 432 transmits the requested data from the specific cache line to the ROP read data return buffer 430. At step 616, the MUX 410 in the ROP 360 receives the requested data from the ROP read data return buffer 430, and the method 600 proceeds to step 618.

If, however, at step 610, the other portion of data necessary to process the atomic operation is currently available in the local ROP cache 414 then the method 600 proceeds to step 612. At step 612, the other portion of data necessary to process the atomic operation is retrieved from the local ROP cache 414 and transmitted to the MUX 410. The method 600 then proceeds to step 618.

At step 618, the atomic command from the atomic command queue 408, the atomic data payload associated with the atomic command from the atomic data buffer 404, and the other portion of data necessary to process the atomic operation from the MUX 410 are transmitted to the ALU 406 for processing. The ALU 406 computes result data based on the atomic command and the two portions of data. The result data is transmitted by the ALU 406 to the result data sequencer 416. In addition, the MUX 410 transmits the other portion of data necessary to process the atomic operation to the result data sequencer 416 as well. At step 620, the result data and the other portion of the data necessary to process the atomic operation is transmitted by the result data sequencer 416 to the ROP result data buffer 434 in the L2 cache slice 438 and the local ROP cache 414.

Figure 7:
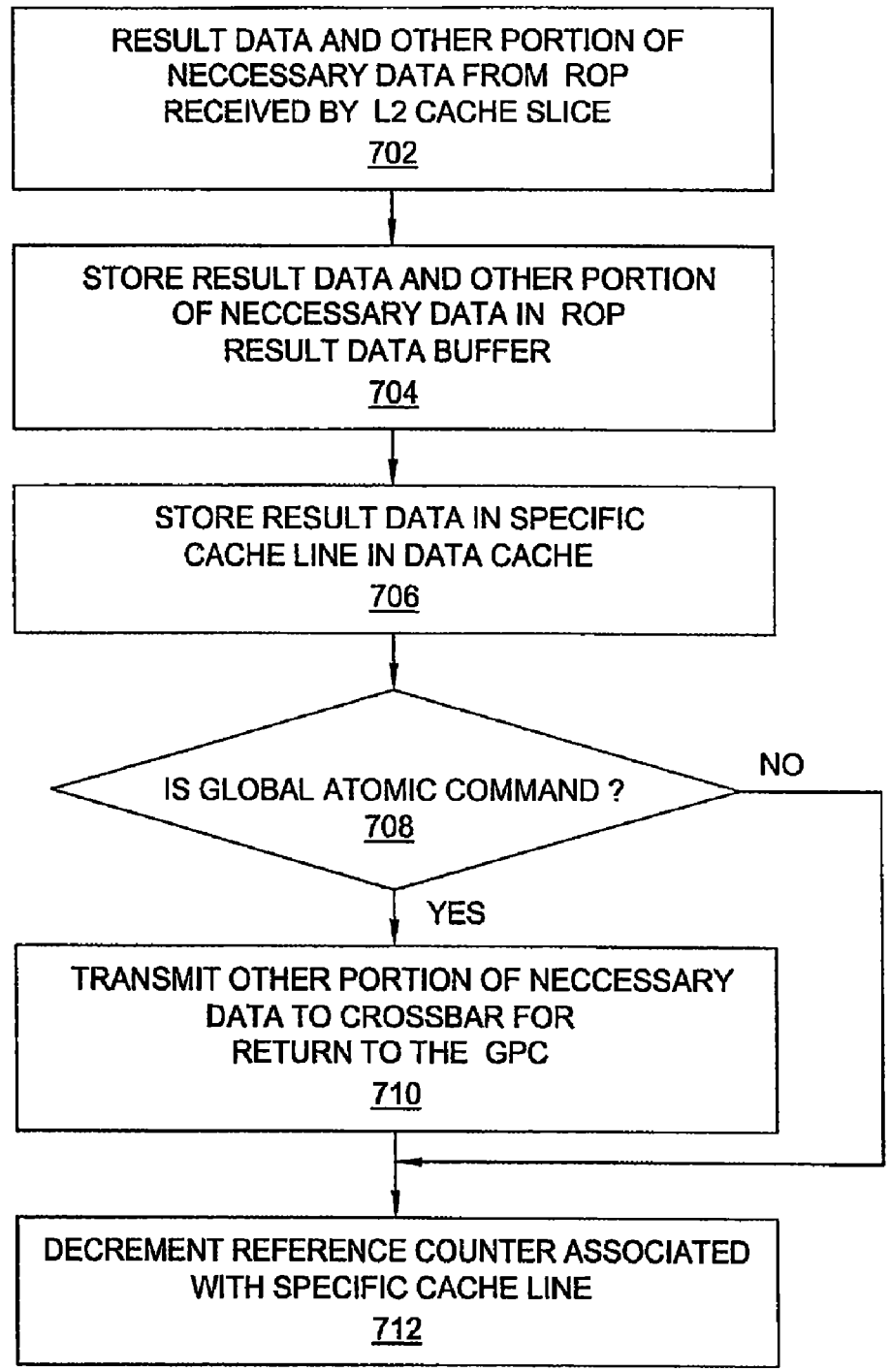
FIG. 7 is a flow diagram of method steps for storing and transmitting the result of an atomic operation received by an L2 cache slice from a ROP, according to one embodiment of the present invention.

FIG. 7 is a flow diagram of method steps for storing and transmitting the result of an atomic operation received by an L2 cache slice 438 from a ROP 360, according to one embodiment of the present invention. Although the method steps are described in conjunction with the systems for FIGS. 1-4B, persons skilled in the art will understand that any system configured to perform the method steps, in any order, is within the scope of the invention.

The method 700 begins at step 702, where the result data and the other portion of the data necessary to process the atomic operation is received from the ROP 360 by the L2 cache slice 438. At step 704, the result data and the other portion of data necessary to process the atomic operation is stored in the ROP result data buffer 434. At step 706, the result data from the ROP result data buffer 434 is stored in the cache line reserved for the atomic operation in the data cache 432. At step 708, if the processed atomic operation is a global atomic operation then the method step 700 proceeds to the step 710. At step 710, the other portion of data from the ROP result data buffer 434 is transmitted to the crossbar result data buffer 436 where the data is temporarily stored until the data is transmitted to the crossbar unit 210 for return to one of the GPCs 208. The method step 700 proceeds to the step 712. If, however, at step 708, the processed atomic operation is a global reduction operation, the method step 700 proceeds directly to step 712. At step 712, the reference counter associated with the cache line reserved for the atomic operation is decremented, indicating that one atomic operation associated with the cache line has been processed.

In sum, control of atomic operations is accomplished by using features of the L2 cache in conjunction with the queuing and caching capability of an associated ROP. An atomic command and associated atomic data payload, received by an L2 cache slice through the crossbar unit, are stored in the crossbar command buffer and crossbar data buffer, respectively. The atomic command includes a memory address associated with a specific cache line in the data cache of the L2 cache slice. If the specific cache line has not previously been reserved, a tag look-up unit reserves the cache line for the atomic operation, increments the reference counter associated with the reserved cache line and may transmit a data request to the FB for the data associated with the reserved cache line. If the cache line associated with the atomic operation is already reserved, the tag look-up unit increments the reference counters associated with the reserved lines, indicating one more atomic operation associated with the specific cache line. The atomic command is eventually transmitted through the tag look-up unit to the ROP for further processing. The atomic data payload is also transmitted from the crossbar data buffer to the atomic data buffer in the ROP.

Upon receiving the atomic command from the specific L2 cache slice, the ROP determines whether the other portion of necessary data required to complete the atomic operation is available in the local cache in the ROP. In the event of a miss in the local cache, the ROP requests the other portion of necessary data required to complete the atomic operation from the data cache of the L2 cache slice. The atomic command is transmitted to the command queue buffer of the ROP, which has a queue of all atomic operations waiting to be transferred to the ALU within the ROP for processing. When the atomic operation reaches the top of the queue, the atomic command, the associated atomic data pay load and the other portion of necessary data required to process the atomic operation, from the local cache in the ROP or the data cache of the L2 cache slice, are processed by the ALU. The results are stored in the local cache of the ROP and returned to a result buffer in the L2 cache slice, where the data is stored until written to the reserved cache line in the data cache associated with the atomic operation. After the result data has been stored in the cache line, the tag look-up unit decrements the reference counters associated with the specific cache line. The result data, as determined by various system elements and parameters, may be transferred from the data cache of the L2 cache slice to the frame buffer at any appropriate time. The result data may also be returned to any of the internal clients via the crossbar unit.

One advantage of the techniques described herein is that related atomic operations (i.e., those associated with the same cache line in the L2 cache slice) received by an L2 cache slice from one or more GPC clients may be pipelined. Pipelining related atomic operation increases the overall processing efficiency since the number of atomic operations stalled in the L2 cache slice while waiting for cache line availability can be reduced. Moreover, caching a portion of data necessary to process the atomic operation in the local cache in the ROP reduces the number of read commands that have to be serviced by the L2 cache slice while processing the atomic operation. In addition, the multi-threaded buffers in the L2 cache slice in which read data requested by the ROP and the result data from atomic operations are stored ensures that the flow of atomic operations is not unnecessarily stalled behind non-atomic operations being processed by the ROP.

While the foregoing is directed to embodiments of the present invention, other and further embodiments of the invention may be devised without departing from the basic scope thereof, and the scope thereof is determined by the claims that follow.

We claim:

1. A method for processing an atomic operation received by an intermediate cache coupled to one or more clients and to an external memory, the method comprising:
    receiving the atomic operation from a client, the atomic operation including an atomic command and an atomic data payload;
    transmitting the atomic command to a tag look-up unit;
    determining whether a cache line within a data cache unit associated with the atomic command is available;
    incrementing a cache line reference counter associated with the cache line; and
    transmitting the atomic command and the atomic payload data to an arithmetic logic unit residing external to the intermediate cache for processing.

2. The method of claim 1, further comprising the steps of receiving from the arithmetic logic unit result data associated with the processed atomic command as well as a second portion of data necessary to process the atomic command, and receiving from the arithmetic logic unit a write command for writing the result data to the cache line within the data cache unit associated with the atomic command.

3. The method of claim 2, further comprising the steps of processing the write command and, as a result, storing the result data in the cache line within the data cache unit.

4. The method of claim 3, further comprising the step of decrementing the reference counter associated with the cache line.

5. The method of claim 4, wherein the atomic command is a global atomic command, and further comprising the step of transmitting to the client the second portion of data necessary to process the atomic operation.

6. The method of claim 1, wherein the arithmetic logic unit resides within a raster operations (ROP) unit, and further comprising the step of receiving a read command from the ROP unit for a second portion of data necessary to process the atomic command.

7. The method of claim 6, further comprising the step of transmitting the read command to the tag look-up unit for processing.

8. The method of claim 7, further comprising the step retrieving the second portion of data necessary to process the atomic command from the cache line within the data cache unit associated with the atomic operation in response to processing the read command, and transmitting the second portion of data necessary to process the atomic command to the ROP unit.

9. The method of claim 7, further comprising the step of retrieving the second portion of data necessary to process the atomic command from the external memory.

10. The method of claim 1, further comprising the steps of:
    receiving a second atomic operation from a client, the second atomic operation including a second atomic command and a second atomic data payload;
    transmitting the second atomic command to a tag look-up unit;
    determining that the second atomic command is associated with the cache line within the data cache unit;
    incrementing the cache line reference counter associated with the cache line; and
    transmitting the second atomic command and the second atomic payload data to the arithmetic logic unit for processing.

11. A system configured process an atomic operation, the system comprising:
    a computation subsystem; and
    an intermediate cache coupled to the computation subsystem, one or more clients and an external memory and including:
        a data cache unit,
        a command buffer configured to receive an atomic command from a client,
        a data buffer configured to store an atomic data payload associated with the atomic command,
        an arbiter configured to select the atomic command for processing,
        a tag look-up unit configured to receive the atomic command from the arbiter and to determine whether a cache line within the data cache unit associated with the atomic command is available, and
        a cache line reference counter associated with the cache line,
        wherein the tag look-up unit is further configured to increment the cache line reference counter and transmit the atomic command to the computation subsystem for processing, and
        wherein the data buffer is configured to transmit the atomic data payload to the computation subsystem for processing.

12. The system of claim 11, wherein the intermediate cache further includes a result data buffer configured to receive from the computation subsystem result data associated with the processed atomic command as well as a second portion of data necessary to process the atomic command.

13. The system of claim 12, wherein the intermediate cache further includes a write command buffer configured to receive from the computation unit a write command for writing the result data to the cache line within the data cache unit associated with the atomic command.

14. The system of claim 13, wherein the tag look-up unit is further configured to process the write command and, as a result, the result data in the result data buffer is written to the cache line within the data cache unit.

15. The system of claim 14, wherein the tag look-up unit is further configured to decrement the reference counter associated with the cache line.

16. The system of claim 11, wherein the intermediate cache further includes a read command buffer configured to receive a read command from the computation subsystem for a second portion of data necessary to process the atomic command and to transmit the read command to the tag look-up unit for processing.

17. The system of claim 16, wherein the tag look-up unit is further configured to retrieve the second portion of data necessary to process the atomic command from the cache line within the data cache unit associated with the atomic operation and to transmit the second portion of data to the computation subsystem.

18. The system of claim 16, wherein the tag look-up unit is further configured to retrieve the second portion of data necessary to process the atomic command from the external memory.

19. The system of claim 11, wherein:
the command buffer is configured to receive a second atomic command from a client,
the data buffer is configured to store a second atomic data payload associated with the second atomic command,
the arbiter is configured to select the second atomic command for processing, and
the tag look-up unit configured to receive the second atomic command from the arbiter and to determine that the cache line within the data cache unit associated with the atomic command is unavailable, to increment the cache line reference counter, and to transmit the second atomic command to the computation subsystem for processing,
wherein the data buffer is configured to transmit the second atomic data payload to the computation subsystem for processing.

20. The system of claim 11, wherein the computation subsystem comprises a raster operations unit that includes an arithmetic logic unit.

* * * * *